US012118889B2

(12) United States Patent
Naserian et al.

(10) Patent No.: US 12,118,889 B2
(45) Date of Patent: Oct. 15, 2024

(54) WARNING SYSTEM FOR ALERTING A VULNERABLE ROAD USER OF A PREDICTED COLLISION WITH A HIDDEN APPROACHING VEHICLE

(71) Applicant: GM Global Technology Operations LLC, Detroit, MI (US)

(72) Inventors: Mohammad Naserian, Windsor (CA); An Xu, Shanghai (CN); Feiyu Cong, Shanghai (CN); Jie Zhu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 246 days.

(21) Appl. No.: 18/051,661

(22) Filed: Nov. 1, 2022

(65) Prior Publication Data

US 2024/0135821 A1 Apr. 25, 2024
US 2024/0233546 A9 Jul. 11, 2024

(30) Foreign Application Priority Data

Oct. 24, 2022 (CN) .......................... 202211303975.2

(51) Int. Cl.
*G08G 1/16* (2006.01)
(52) U.S. Cl.
CPC .................... *G08G 1/166* (2013.01)
(58) Field of Classification Search
CPC ........ G08G 1/166; G08G 1/005; G08G 1/095; G08G 1/164; B60Q 1/525; B60Q 2400/50; G08B 7/06; G08B 3/00; G08B 6/00; G08B 21/18
See application file for complete search history.

(56) References Cited

U.S. PATENT DOCUMENTS

| 2017/0268896 | A1* | 9/2017 | Bai .................... G01C 21/3484 |
| 2018/0286223 | A1* | 10/2018 | Ova ..................... G08G 1/0129 |
| 2019/0037499 | A1* | 1/2019 | Son .................. G08G 1/096791 |
| 2019/0208449 | A1* | 7/2019 | Wang .................. H04W 36/322 |
| 2019/0287396 | A1* | 9/2019 | Sayin ....................... G08G 1/07 |
| 2021/0063546 | A1* | 3/2021 | Slobodyanyuk ........ G01S 13/91 |
| 2022/0066051 | A1* | 3/2022 | Hirohata ............... G01S 5/0027 |
| 2022/0388505 | A1* | 12/2022 | Sharma Banjade ........................ G08G 1/096783 |

* cited by examiner

*Primary Examiner* — Sisay Yacob
(74) *Attorney, Agent, or Firm* — Vivacqua Crane, PLLC

(57) ABSTRACT

A warning system is provided for alerting a Vulnerable Road User (VRU) of a predicted collision. The system includes one or more input devices for transmitting a first input signal associated with a first vehicle positioned in a first lane, a second input signal associated with a second vehicle positioned in a second lane, and a third input signal associated with the VRU located on a crosswalk that extends across the first and second lanes. The system further includes a computer having a processor and a non-transitory computer readable medium. The processor is programmed to determine the predicted collision between the second vehicle and the VRU at a predicted collision site. The processor is further programmed to generate an actuation signal. One or more roadway notification devices notify the VRU that the second vehicle is positioned in the second lane and headed toward the predicted collision site in the crosswalk.

20 Claims, 3 Drawing Sheets

WARNING SYSTEM FOR ALERTING A VULNERABLE ROAD USER OF A PREDICTED COLLISION WITH A HIDDEN APPROACHING VEHICLE

INTRODUCTION

The present disclosure relates to warning systems for alerting a Vulnerable Road User ("VRU") of a predicted collision, and more particularly to a warning system for alerting the VRU of the predicted collision with an approaching vehicle where another vehicle blocks a line of sight between the VRU and the approaching vehicle.

Modern vehicles can include a Pedestrian Detection system ("PD system") with Automated Emergency Braking to prevent imminent collisions between the vehicle and the VRU. Examples of VRUs include individuals located on or alongside a roadway without the protective rigid covering of a metal automobile (e.g., a pedestrian, a roadway worker, an individual operating a wheelchair or other personal mobility device, whether motorized or not, an individual operating an electric scooter or the like, an individual operating a bicycle or other non-motorized means of transportation, and individuals operating a motorcycle, etc.). The PD system can include one or more notification devices that alert the driver of a vehicle that a collision between the VRU and the vehicle is imminent. The notification devices can provide a visual warning, an audible warning, or a tactile warning perceived by the driver. However, these systems do not alert third parties, e.g., the VRUs, particularly when another vehicle is blocking a line of sight between the host vehicle and the VRU. Furthermore, because the notification devices are integrated within vehicles, the notification devices can consume vehicle resources (e.g., battery power, network resources, service life of vehicle components, etc.).

Thus, while the current PD systems achieve their intended purpose, there is a need for a new and improved warning system that addresses these issues.

SUMMARY

According to several aspects, a warning system is provided for alerting a Vulnerable Road User (VRU) of a predicted collision. The warning system includes one or more input devices for transmitting a first input signal associated with a first vehicle positioned in a first lane of a roadway. The warning system includes one or more input devices for transmitting a second input signal associated with a second vehicle positioned in a second lane of the roadway adjacent to the first lane. The warning system includes one or more input devices for transmitting a third input signal associated with the VRU located on a crosswalk that extends across the first and second lanes. The warning system further includes a computer mounted to at least one of the first vehicle and a roadside sensor unit. The computer includes one or more processors electrically connected to the input devices and receiving the first, second, and third input signals from the input devices. The computer further includes a non-transitory computer readable storage medium (CRM) for storing instructions, such that the processor is programmed to determine the predicted collision between the second vehicle and the VRU at a predicted collision site within a predicted time to collision based on the second and third input signals. The processor is further programmed to generate an actuation signal, in response to the processor determining the predicted collision. One or more roadway notification devices is coupled to the roadway for notifying the VRU that the second vehicle is positioned in the second lane and headed toward the crosswalk, in response to the roadway notification device receives the actuation signal from the processor.

In one aspect, the processor is further programmed to determine that the first vehicle has a heading toward the VRU and the first vehicle is waiting for the VRU to travel across the crosswalk, in response to the processor receiving the first and third input signals from the input devices. The processor is further programmed to generate the actuation signal, in further response to the processor determining that the first vehicle has a heading toward the VRU and the first vehicle is waiting for the VRU to travel across the crosswalk.

In another aspect, the processor is further programmed to determine that the second vehicle is travelling toward the predicted collision site in the crosswalk, in response to the processor receiving the second and third input signals from the input devices. The processor is further programmed to generate the actuation signal, in further response to the processor determining that the second vehicle is travelling toward the predicted collision site in the crosswalk.

In another aspect, the processor is further programmed to determine that the VRU is travelling toward the predicted collision site in the crosswalk, in response to the processor receiving the second and third input signals from the input devices. The processor is further programmed to generate the actuation signal, in further response to the processor determining that the VRU is travelling toward the predicted collision site in the crosswalk.

In another aspect, the processor is further programmed to determine a predicted time-to-collision (predicted TTC), in response to the processor receiving the second and third input signals from the input devices. The processor 150 is further programmed to compare the predicted TTC to a predetermined time threshold. The processor is further programmed to generate the actuation signal, in further response to the processor determining that the predicted TTC is less than the predetermined time threshold.

In another aspect, the processor is further programmed to determine that the second vehicle is located at a closing distance from the predicted collision site, in response to the processor receiving the second and third input signals from the input devices. The processor is further programmed to compare the closing distance to a predetermined distance threshold. The processor is further programmed to generate the actuation signal in further response to the processor determining that the closing distance is less than the predetermined distance threshold.

In another aspect, the roadway notification devices includes a display device for displaying a visible alert related to the VRU, a speaker for emitting an audible alert related to the VRU, and/or a haptic device.

In another aspect, the roadway notification devices further include a traffic light signal facing the second vehicle, with the traffic light signal emitting a red light in response to the traffic light signal receiving the actuation signal from the processor. The roadway notification devices can further include a plurality of indicator lights attached to the roadway and positioned about the crosswalk, with the indicator lights emitting a light in response to the indicator lights receiving the actuation signal from the processor.

According to several aspects, a warning system is provided for alerting a Vulnerable Road User (VRU) of a predicted collision. The warning system includes one or more input devices for transmitting a first input signal associated with a first vehicle positioned in a first lane of a roadway, a second input signal associated with a second vehicle positioned in a second lane of the roadway adjacent to the first lane, and a third input signal associated with the VRU located on a crosswalk that extends across the first and second lanes. The warning system further includes one or more roadway notification devices coupled to the roadway. The roadway notification device is positioned within a line of sight of the VRU and notifies the VRU that the second vehicle is positioned in the second lane and headed toward the crosswalk. The warning system further includes a computer mounted to the first vehicle. The computer includes one or more processors electrically connected to the input devices and receiving the first, second, and third input signals from the input devices. The computer further includes a non-transitory computer readable storage medium (CRM) for storing instructions, such that the processor is programmed to determine the predicted collision between the second vehicle and the VRU at a predicted collision site within a predicted time to collision based on the second and third input signals. The processor is further programmed to generate an actuation signal, in response to the processor determining the predicted collision. The roadway notification device notifies the VRU that the second vehicle is positioned in the second lane and headed toward the crosswalk, in response to the roadway notification device receiving the actuation signal from the processor.

In one aspect, the input devices include a RADAR device, a V2X input device, and/or a forward collision module integrated within the first vehicle, the second vehicle, and/or a roadside sensor unit.

In another aspect, the forward collision module is configured to generate the first input signal associated with the VRU being positioned in a first path of the first vehicle and the VRU having a heading toward the predicted collision site within a second path of the second vehicle.

In another aspect, the warning system further includes one or more vehicle notification devices mounted to the first vehicle. The vehicle notification device is configured to notify the VRU that the second vehicle is positioned in the second lane and headed toward the crosswalk, in response to the vehicle notification device receiving the actuation signal from the processor.

In another aspect, the processor is further programmed to determine that the first vehicle has a heading toward the VRU and the first vehicle is waiting for the VRU to travel across the crosswalk, in response to the processor receiving the first and third input signals from the input devices. The processor is further programmed to generate the actuation signal, in further response to the processor determining that the first vehicle has a heading toward the VRU and the first vehicle is waiting for the VRU to travel across the crosswalk.

In another aspect, the processor is further programmed to determine that the second vehicle is travelling toward the predicted collision site in the crosswalk, in response to the processor receiving the second and third input signals from the input devices. The processor is further programmed to generate the actuation signal, in further response to the processor determining that the second vehicle is travelling toward the predicted collision site in the crosswalk.

In another aspect, the processor is further programmed to determine that the VRU is travelling toward the predicted collision site in the crosswalk, in response to the processor receiving the second and third input signals from the input devices. The processor is further programmed to generate the actuation signal, in further response to the processor determining that the VRU is travelling toward the predicted collision site in the crosswalk.

In another aspect, the processor is further programmed to determine a predicted time-to-collision (predicted TTC), in response to the processor receiving the second and third input signals from the input devices. The processor is further programmed to compare the predicted TTC to a predetermined time threshold. The processor is further programmed to generate the actuation signal, in further response to the processor determining that the predicted TTC is less than the predetermined time threshold.

In another aspect, the processor is further programmed to determine that the second vehicle is located at a closing distance from the predicted collision site, in response to the processor receiving the second input signal from the input device. The processor is further programmed to compare the closing distance to a predetermined distance threshold. The processor is further programmed to generate the actuation signal, in further response to the processor determining that the closing distance is less than the predetermined distance threshold.

According to several aspects, a method is provided for operating a warning system for alerting a Vulnerable Road User (VRU) of a predicted collision. The method includes transmitting, using one or more input devices, a first input signal associated with a first vehicle positioned in a first lane of a roadway. The method further includes transmitting, using one or more input devices, a second input signal associated with a second vehicle positioned in a second lane of the roadway adjacent to the first lane. The method further includes transmitting, using one or more input devices, a third input signal associated with the VRU located on a crosswalk that extends across the first and second lanes. The method further includes determining, using one or more processors of a computer having a non-transitory computer readable storage medium (CRM) for storing instructions, the predicted collision between the second vehicle and the VRU at a predicted collision site within a predicted time to collision based on the second and third input signals. The method further includes generating, using the processor, an actuation signal in response to the processor determining the predicted collision. The method further includes notifying, using one or more roadway notification devices, the VRU that the second vehicle is positioned in the second lane and headed toward the crosswalk in response to the roadway notification device receiving the actuation signal from the processor.

In one aspect, the method further includes determining, using the processor, that the first vehicle has a heading toward the VRU and the first vehicle is waiting for the VRU to travel across the crosswalk in response to the processor receiving the first and third input signals from the input devices. The method further includes determining, using the processor, that the second vehicle is travelling toward the predicted collision site in the crosswalk in response to the processor receiving the second and third input signals from the input devices. The method further includes determining, using the processor, that the VRU is travelling toward the predicted collision site in the crosswalk in response to the processor receiving the second and third input signals from the input devices. The method further includes generating, using the processor, the actuation signal in further response to the processor: determining that the first vehicle has a heading toward the VRU and the first vehicle is waiting for the VRU to travel across the crosswalk; and determining that the second vehicle and the VRU are travelling toward the predicted collision site in the crosswalk.

In another aspect, the method further includes determining, using the processor, that the second vehicle is located at a closing distance from the predicted collision site in response to the processor receiving the second input signal from the input device. The method further includes comparing, using the processor, the closing distance to a predetermined distance threshold. The method further includes comparing, using the processor, the predicted time to collision to a predetermined time threshold. The method further includes generating, using the processor, the actuation signal in further response to the processor determining that the closing distance is less than the predetermined distance threshold and determining that the predicted time to collision is less than the predetermined time threshold.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
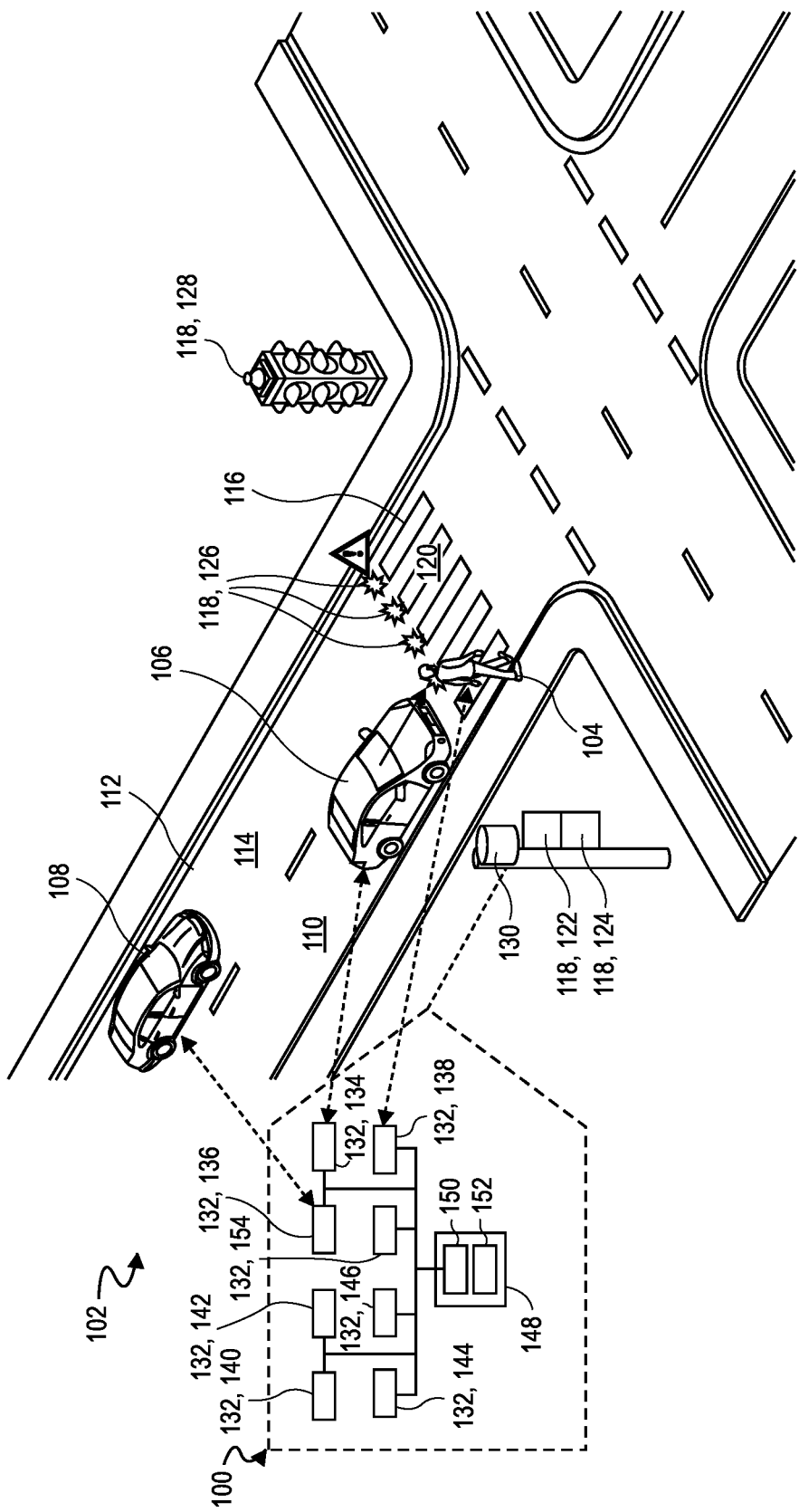
FIG. 1 is a schematic view of one non-limiting example of a warning system using a network and a roadside sensor unit for alerting a Vulnerable Road User ("VRU") of a predicted collision between the VRU and the vehicle when a line of sight between the same is blocked.

Referring to FIG. 1, there is generally illustrated one example of a warning system 100 (system) using a network 102 to alert a Vulnerable Road User 104 (VRU) of a predicted collision with the VRU 104, when a first vehicle 106 blocks a line of sight between the VRU 104 and a second vehicle 108. In this non-limiting example, the first vehicle 106 is positioned in a first lane 110 of a roadway 112, and the second vehicle 108 is positioned in a second lane 114 adjacent to the first lane 110. The VRU 104 is positioned on a crosswalk 116 extending across the first and second lanes 110, 114 with the VRU 104 heading from the first lane 110 toward the second lane 114. In other non-limiting examples, the VRU can be positioned on other portions of the crosswalk, other portions of the roadway, a sidewalk adjacent to the roadway, or other locations where the VRU is heading toward any predicted collision site and where the first vehicle blocks a line of sight between the VRU 104 and the second vehicle 108. The VRU 104 may be an individual located on or alongside the roadway without the protective rigid covering of a metal automobile (e.g., a pedestrian, a roadway worker, an individual operating a wheelchair or other personal mobility device, whether motorized or not, an individual operating an electric scooter or the like, an individual operating a bicycle or other non-motorized means of transportation, and individuals operating a motorcycle).

More specifically, the system 100 incudes one or more roadway notification devices 118 for alerting the VRU 104, the second vehicle 108, and/or an occupant of the second vehicle 108 of the predicted collision between the VRU 104 and the second vehicle 108. In this non-limiting example, the roadway notification devices 118 are integrated within the roadway 112 or a traffic control infrastructure. The roadway notification devices 118 receive power from an electrical grid, a solar power module, or other suitable power supplies that are separate from a vehicle for conserving vehicle resources (e.g., battery power, network resources, service life of vehicle components, etc.).

The roadway notification device 118 may be configured to notify the VRU 104 that the second vehicle 108 is positioned in the second lane 114 and headed toward a predicted collision site 120 in the crosswalk 116 where the VRU 104 is headed. In this non-limiting example, the roadway notification device 118 may include a display device 122 for displaying a visible alert related to the VRU 104 (e.g., a crosswalk signal flashing a message, icon, symbol, color, or other suitable indicia associated with the second vehicle 108 heading toward the crosswalk 116 and the predicted collision site), a speaker 124 (e.g., mounted to the crosswalk signal) for emitting an audible alert related to the predicted collision between the VRU, and a haptic device (e.g., a wearable device carried by the VRU, such as a smart watch, a smart phone, etc.). The roadway notification devices 118 may further include a plurality of indicator lights 126 attached to the roadway 112 and positioned about the crosswalk 116 (e.g., along or spaced about lines designating the crosswalk), with the indicator lights 126 emitting a light for alerting the VRU 104 of the second vehicle 108 approaching the crosswalk 116.

The roadway notification device 118 may be configured to notify the second vehicle 108 and/or an occupant of the second vehicle that the VRU 104 is headed toward the predicted collision site in the path of the second vehicle 108, e.g. a portion of the crosswalk in the second lane 114. The roadway notification devices 118 may include a traffic light signal 128 facing the second vehicle 108, with the traffic light signal 128 configured to emit a light associated with an instruction for the occupant of the second vehicle 108 to stop the second vehicle 108 before the second vehicle 108 reaches the predicted collision site in the crosswalk 116.

The system 100 further includes a roadside sensor unit 130 (RSS unit), which is mounted to roadway infrastructure and includes one or more input devices 132 for detecting parameters associated with the first vehicle 106, the second vehicle 108, and/or the VRU 104. Each one of the input devices 132 can be stand-alone devices mounted one or more roadway infrastructure elements or integral components of the RSS unit 130 or other systems, e.g., a traffic monitoring system integrated within roadway infrastructure. The input devices 132 may include a first input device 134 for transmitting a first input signal associated with the first vehicle 106 positioned in the first lane, a second input device 136 for transmitting a second input signal associated with the second vehicle 108 positioned in the second lane 114, and a third input device 138 for transmitting a third input signal associated with the VRU 104 located on the crosswalk 116. Non-limiting examples of the input devices 132 can include one or more a Light Detection and Ranging sensor 140 (LiDAR sensor), RADAR sensors 142 (e.g., short range radar sensors, Millimeter-Wave Radar sensors), infrared cameras, stereo vision camera sensors 144, and/or other suitable sensors. In other non-limiting examples, the input device 132 can include a V2X module 146 for receiving a signal associated with a location and a velocity of the first vehicle 106 and/or the second vehicle 108. It is contemplated that fusion of data from multiple different sensors can bring redundancy and complementary characteristics of sensors for improving the reliability and accuracy of the sensors.

The RSS unit 130 further includes a computer 148 having one or more processors 150 electrically connected (e.g., wired or wirelessly) to the input devices 132. The computer 148 further includes a non-transitory computer readable storage medium 152 (CRM) storing instructions. In this non-limiting example, the processor 150 is electrically connected to the first, second, and third input devices for receiving the first, second, and third input signals from an associated one of the first, second, and third input devices 134, 136, 138. The CRM 152 stores instructions, such that the processor 150 is programmed to determine the predicted collision between the second vehicle 108 and the VRU 104 at the predicted collision site within a predicted time-to-collision (predicted TTC) based on the second and third input signals. As described in detail below, the processor 150 is further programmed to generate an actuation signal, in response to the processor determining the predicted collision.

More specifically, the processor 150 is programmed to determine that the first vehicle 106 has a heading toward the VRU 104 and the first vehicle is waiting for the VRU 104 to travel across the crosswalk 116, in response to the processor 150 receiving the first and third input signals from the first and third input devices 132. The processor 150 is further programmed to generate the actuation signal, in further response to the processor 150 determining that the first vehicle 106 has a heading toward the VRU 104 and the first vehicle is waiting for the VRU 104 to travel across the crosswalk 116. The processor 150 is further programmed to determine that the second vehicle 108 is travelling toward the predicted collision site in the crosswalk 116, in response to the processor 150 receiving the second and third input signals from the second and third input devices 132. The processor 150 is further programmed to generate the actuation signal, in further response to the processor 150 determining that the second vehicle 108 is travelling toward the predicted collision site in the crosswalk 116. The processor 150 is further programmed to determine that the VRU 104 is travelling toward the predicted collision site in the crosswalk 116, in response to the processor 150 receiving the second and third input signals from the second and third input devices 132.

The processor 150 is further programmed to generate the actuation signal, in further response to the processor 150 determining that the VRU 104 is travelling toward the predicted collision site in the crosswalk 116. The processor 150 is further programmed to determine the predicted TTC based on the second and third input signals and compare the predicted TTC to a predetermined time threshold. The processor 150 is further programmed to generate the actuation signal, in further response to the processor 150 determining that the predicted TTC is less than the predetermined time threshold. The processor 150 is further programmed to determine that the second vehicle 108 is located at a closing distance from the predicted collision site, in response to the processor receiving the second and third input signals from the second and third input devices 132, compare the closing distance to a predetermined distance threshold, and generate the actuation signal, in further response to the processor 150 determining that the closing distance is less than the predetermined distance threshold.

The processor 150 may be programmed to utilize any suitable Deep Neural Network ("DNN"), e.g., a Convolutional Neural Network ("CNN"), to classify objects detected by the input devices 132 and determine that the VRU 104 and the second vehicle 108 are travelling toward the predicted collision site 120 at a common predicted TTC. The processor 150 may be programmed to determine that a first detected object is the first vehicle 106 positioned in the first lane 110 and yielding to the VRU 104, in response to the processor 150 receiving the first input signal from the first input device 134 (e.g., the radar unit 154 and/or the V2X module 146). The processor 150 may be programmed to determine that a second detected object is the second vehicle 108 traveling in the second lane 114 toward the crosswalk 116, in response to the processor 150 receiving the second input signal from the second input device 136 (e.g., the radar unit 154 and/or the V2X module 146). The processor 150 may be programmed to determine that a third detected object is a Vulnerable Road User ("VRU") and determine a location and a velocity of the VRU 104, in response to the processor 150 receiving the third input signal from the input device 132, e.g., the radar unit 154. The processor 150 may be programmed to determine that the VRU 104 is travelling along the crosswalk 116 with the first vehicle 106 blocking the line of sight between the VRU 104 and the second vehicle 108 and further determine that the VRU 104 and the second vehicle 108 are travelling toward the predicted collision site in the crosswalk 116 at the common predicted TTC, in response to the processor 150 receiving the first, second, and third input signals from the associated first, second, and third input devices 132.

In this non-limiting example, the roadway notification device 118 is coupled to the roadway 112 for notifying the VRU 104 that the second vehicle 108 is positioned in the second lane 114 and headed toward the crosswalk 116, in response to the roadway notification device receiving the actuation signal from the processor 150. The traffic light signal 128 may emit a light, e.g. a red light, for instructing the second vehicle 108 to stop before the crosswalk 116, in response to the traffic light signal receiving the actuation signal from the processor. The indicator lights 126 may emit the light for alerting the VRU 104 of the second vehicle 108 approaching the crosswalk 116, in response to the indicator lights 126 receiving the actuation signal from the processor 150.

Figure 2:
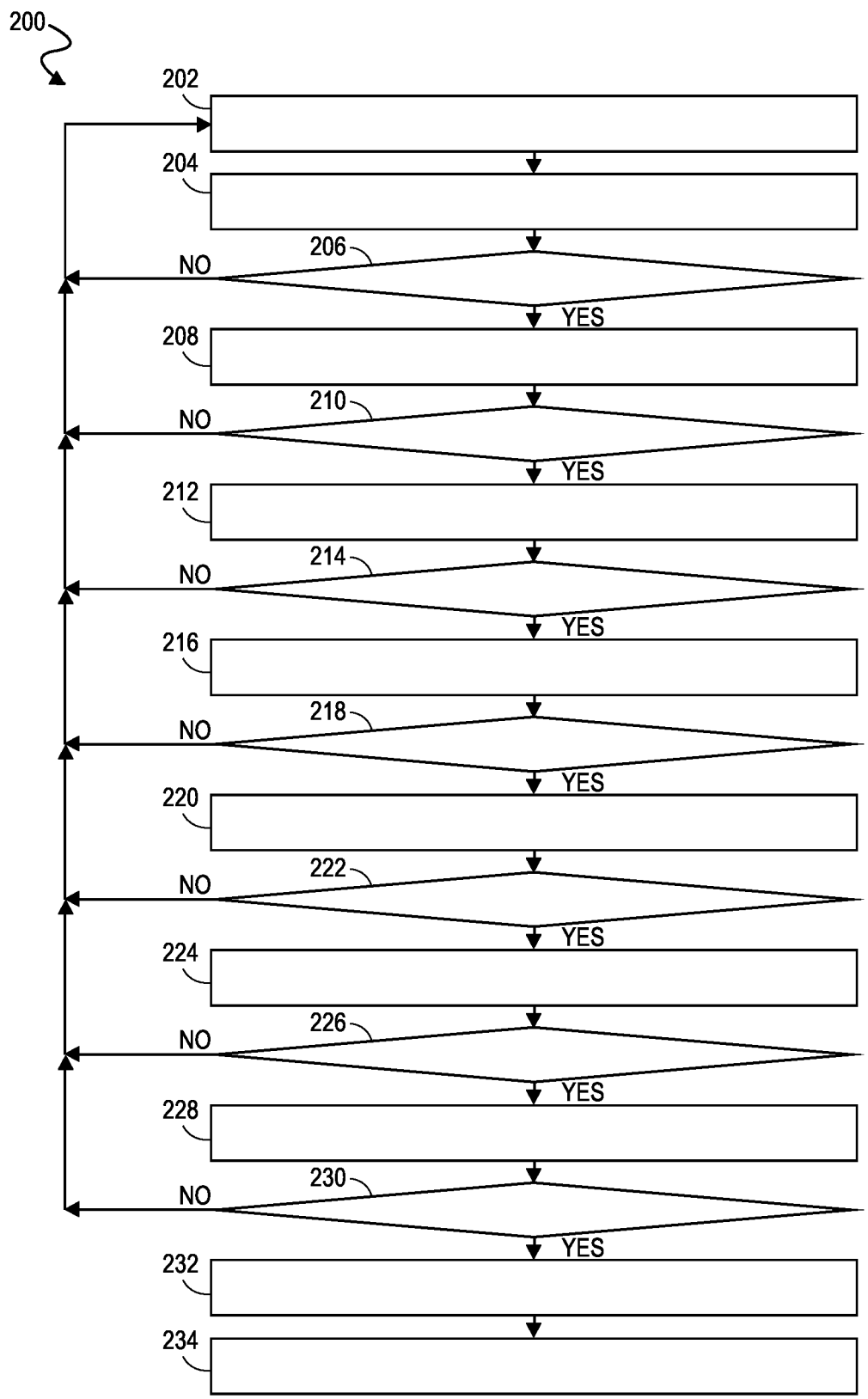
FIG. 2 is a flow chart of one non-limiting example of a method for operating the warning system of FIG. 1.

Referring to FIG. 2, one non-limiting example of a method 200 is provided for operating the system 100 of FIG. 1. The method 200 begins at block 202 with transmitting, using one or more input devices 132, multiple input signals associated with the first vehicle 106, the first lane 110, the second vehicle 108, the second lane 114, the VRU 104, and/or the crosswalk 116. In this non-limiting example, the method 200 includes transmitting, using one or more input devices 132, the first input signal associated with the first vehicle 106 positioned in the first lane 110 of the roadway 112. The method 200 further includes transmitting, using one or more input devices 132, the second input signal associated with the second vehicle 108 positioned in the second lane 114 of the roadway 112. The method 200 further includes transmitting, using one or more input devices 132, the third input signal associated with the VRU 104 located on the crosswalk 116. The method 200 then proceeds to block 204.

At block 204, the method 200 further includes determining, using the processor 150, a location of the VRU 104, a location of the crosswalk 116, a location of the first vehicle 106, and a location of the first lane 110 in response to the processor 150 receiving the input signals from the input devices 132 (e.g., the first and third input signals from the first and third input devices 132). The method 200 then proceeds to block 206.

At block 206, the method 200 further includes comparing the location of the VRU 104 to both the location of the crosswalk 116 and the location of the first vehicle 106, in response to the processor 150 determining the locations of the VRU 104, the crosswalk 116, the first vehicle 106, and the first lane 110. If the processor 150 determines that the VRU 104 is positioned on the crosswalk 116 further determines that the first vehicle 106 and the VRU are positioned in a common lane (e.g. the first lane 110), the method proceeds to block 208. If the processor 150 determines that the VRU 104 is not positioned on the crosswalk 116 and/or determines that the first vehicle 106 and the VRU are not positioned in a common lane (e.g. the first lane 110), the method 200 returns to block 202.

At block 208, the method 200 further includes determining, using the processor 150, a heading of the first vehicle 106, in response to the processor 150 receiving the input signal from the input device 132 (e.g., the first input signal from the first input device 134). The method 200 then proceeds to block 210.

At block 210, the method 200 further includes comparing, using the processor 150, the heading of the first vehicle 106 to the location of the VRU 104. If the processor 150 determines that the first vehicle 106 has a heading toward the VRU 104, the method 200 proceeds to block 2. If the processor 150 determines that the first vehicle 106 is not facing the VRU 104, the method 200 returns to block 202.

At block 212, the method 200 further includes determining, using the processor 150, a first velocity of the first vehicle 106, in response to the processor 150 receiving the input signal from the input device (e.g., the first input signal from the first input device 134). The method then proceeds to block 214.

At block 214, the method 200 further includes comparing, using the processor 150, the first velocity of the first vehicle 106 to a first velocity threshold. If the processor 150 determines that the first velocity of the first vehicle 106 is less than the first velocity threshold, the processor 150 determines that the first vehicle 106 is yielding to the VRU 104 or the first vehicle 106 is waiting for the VRU 104 to travel across the crosswalk 116, and the method 200 proceeds to block 216. If the processor 150 determines that the first velocity of the first vehicle 106 is not less than the first velocity threshold, the method 200 returns to block 202.

At block 216, the method 200 further includes determining, using the processor 150, a location of the second vehicle 108 and a location of the second lane 114, in response to the processor 150 receiving the input signal from the input device (e.g., the second input signal from the second input device 136). The method 200 then proceeds to block 218.

At block 218, the method 200 further includes comparing, using the processor 150, the location of the second vehicle 108 to the location of the second lane 114. If the processor 150 determines that second vehicle 108 is positioned in the second lane 114, the method 200 proceeds to block Z20. If the processor 150 determines that second vehicle 108 is not positioned in the second lane 114, the method 200 returns to block 202.

At block 220, the method 200 further includes determining, using the processor 150, a heading of the second vehicle 108, in response to the processor 150 receiving the second input signal from the second input device 136. The method 200 then proceeds to block 222.

At block 222, the method 200 further includes comparing, using the processor 150, the heading of the second vehicle 108 to a location of the crosswalk 116. If the processor 150 determines that the second vehicle 108 has a heading toward the crosswalk 116, the method 200 proceeds to block 224. If the processor 150 determines that the second vehicle 108 does not have a heading toward the crosswalk 116, the method 200 returns to block 202.

At block 224, the method 200 further includes determining, using the processor 150, that the second vehicle 108 is located at a closing distance from the predicted collision site in the crosswalk 116, in response to the processor 150 receiving the input signal from the input device 132 (e.g., the second input signal from the second input device 136). The method 200 then proceeds to block 226.

At block 226, the method 200 further includes comparing, the processor 150, the closing distance of the second vehicle 108 to a predetermined distance threshold. If the processor 150 determines that the closing distance of the second vehicle 108 is less than the predetermined distance threshold, the method 200 proceeds to block 228. If the processor 150 determines that the closing distance of the second vehicle 108 is not less than the predetermined distance threshold, the method 200 returns to block 202.

At block 228, the method 200 further includes determining, using the processor 150, the predicted collision between the VRU 104 and the second vehicle 108 at the predicted collision site within the predicted TTC based on the input signals from the input devices (e.g., the first and third input signals from the first and third input devices 132). The method 200 then proceeds to block 230.

At block 230, the method 200 further includes comparing, using the processor 150, the predicted TTC to a predetermined time threshold. If the processor 150 determines that the predicted TTC to is less than the predetermined time threshold, the method 200 proceeds to block 232. If the processor 150 determines that the predicted TTC to is not less than the predetermined time threshold, the method 200 returns to block 202.

At block 232, the method 200 further includes determining, using the processor 150, that the first vehicle 106 is blocking the line of sight between the VRU 104 and the second vehicle 108. The method 200 further includes determining, using the processor 150, that the VRU 104 and the second vehicle 108 are travelling toward the predicted collision site in the crosswalk 116. The method 200 then proceeds to block 234.

At block 234, the method 200 further includes generating, using the processor 150, the actuation signal in response to the processor 150 determining the predicted collision (e.g., in the crosswalk or other suitable locations). The method 200 further includes generating, using the processor 150, the actuation signal in further response to the processor: determining that the first vehicle has a heading toward the VRU 104 and the first vehicle is waiting for the VRU 104 to travel across the crosswalk 116; and determining that the second vehicle 108 and the VRU 104 are travelling toward the predicted collision site 120 in the crosswalk 116. The method 200 further includes generating, using the processor 150, the actuation signal in further response to the processor 150 determining that the closing distance is less than the predetermined distance threshold and determining that the predicted time to collision is less than the predetermined time threshold. The method 200 then proceeds to block 236.

At block 236, the method 200 further includes notifying, using the roadway notification device 118, the VRU 104 that the second vehicle 108 is positioned in the second lane 114 and headed toward the crosswalk 116 in response to the roadway notification device 118 receiving the actuation signal from the processor 150. In other non-limiting examples, the method 200 may further include notifying, using the vehicle notification device, the VRU 104 and/or the second vehicle 108 of the predicted collision between the VRU 104 and the second vehicle 108.

Figure 3:
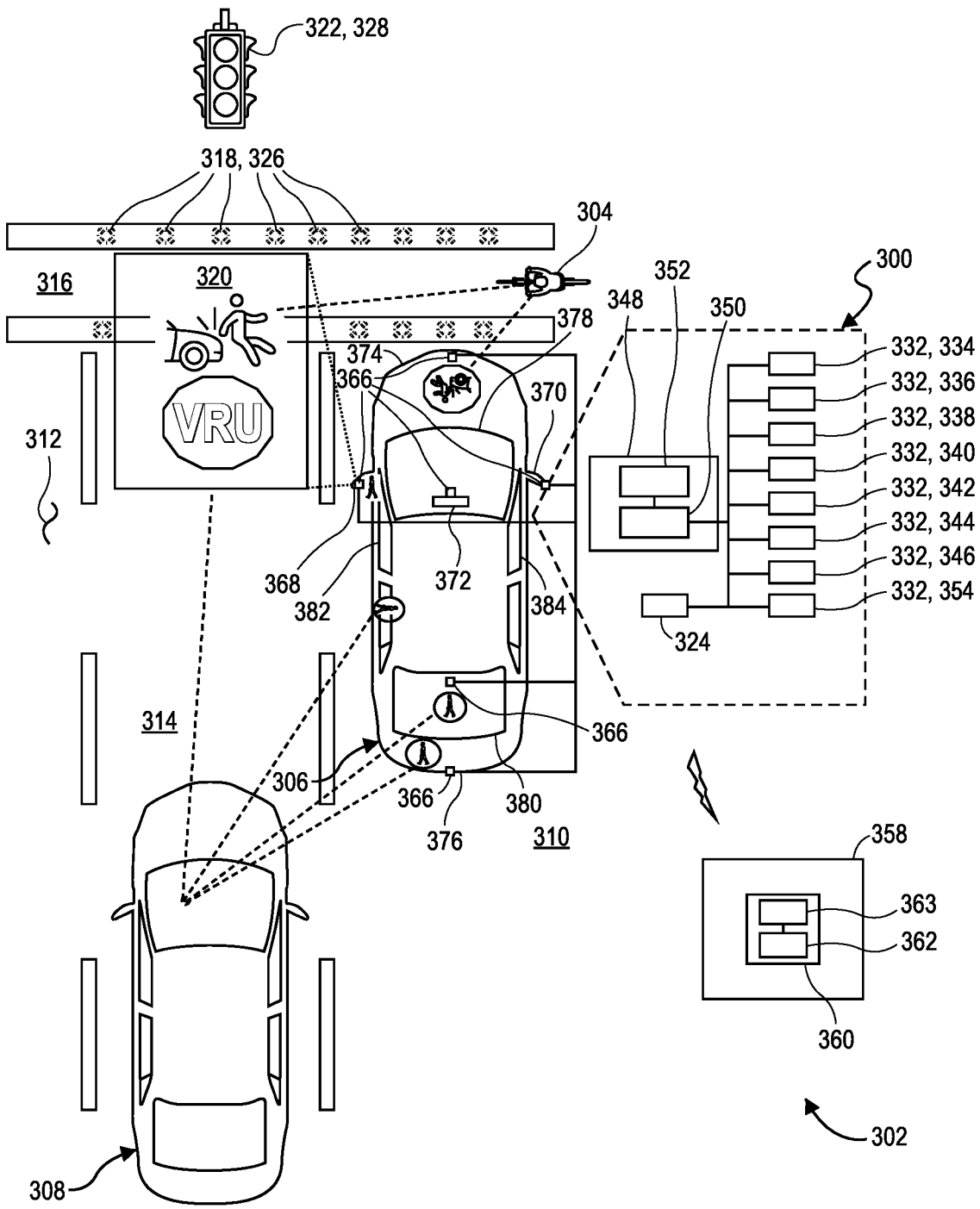
FIG. 3 is a schematic view of another non-limiting example of the warning system of FIG. 1, illustrating the system using a network and V2X connectivity for alerting the VRU of the predicted collision.

Referring to FIG. 3, another non-limiting example of a system 300 is similar to the system 100 of FIG. 1 and has similar components identified by the same reference numbers increased by 200. While the system 100 of FIG. 1 includes the RSS unit 130 with the input devices 132 and the computer 148, the system 300 further includes one or more vehicles (e.g., the first vehicle 306 and/or the second vehicle 308) with V2X and/or a V2V connectivity and including the input devices 332 and the computer 348. Non-limiting examples of the input devices 332 can include one or more a Light Detection and Ranging sensor 340 (LiDAR sensor), RADAR sensors 354 (e.g., short range radar sensors, Millimeter-Wave Radar sensors), infrared cameras 342, stereo vision camera sensors 344, a V2X module 346 and/or a V2V module 347 for receiving a signal associated with a location and a velocity of the first and second vehicles 306, 308 and/or other suitable sensors mounted to the first vehicle 306. Each one of the input devices 332 can be stand-alone devices mounted to the first vehicle 106 or integral components of other systems, e.g., a Forward Collision Mitigation system ("FCM system"). It is contemplated that fusion of data from multiple different sensors can bring redundancy and complementary characteristics of sensors for improving the reliability and accuracy of the sensors.

The network 302 further includes the centralized cloud data center 358 having a remote server 360 with one or more remote processors 362 receiving the input signals from processors of one or more vehicles (e.g., the second vehicle 308). The remote server 360 further includes a remote non-transitory host computer readable storage medium 352 ("CRM") storing instructions, such that the remote processor 362 is programmed to determine the location and the velocity of the first vehicle 306, the second vehicle 308, and/or the VRU 304 based on the input signal. The remote processor 150 further identifies one or more local vehicles (e.g., the first vehicle 306) within a predetermined distance from the location of the VRU 304 based on input signals received from the input device of the local vehicle (e.g., the first input signal from the first input device 332 of the first vehicle 306). The remote processor 150 may further transmit the actuation signal to the local vehicle (e.g., the first vehicle 306), with the actuation signal being based on the associated locations and velocities of the first vehicle 306, the second vehicle 308 and/or the VRU 304.

In one non-limiting example, the computer can be an External Object Calculating Module ("EOCM"), which is a central computer for two or more vehicle safety systems. In another non-limiting example, the system can include a Controller Area Network ("CAN bus") for allowing multiple microcontrollers and devices of other systems, e.g., the FCM system and others, to communicate with the applications of one another without a dedicated host computer.

Furthermore, while the system 100 of FIG. 1 includes the roadway notification devices 118 exclusively in the roadway infrastructure, the system 300 further includes one or more vehicles (e.g., the first vehicle 306) having one or more vehicle notification devices 364 configured to alert the VRU 304 and/or the second vehicle 308 that the second vehicle 308 is positioned in the second lane 314 and headed toward the predicted collision site in the crosswalk 316, in response to the vehicle notification device 364 receiving the actuation signal from the processor 350.

The vehicle notification device 364 may include a display device 322 (e.g., integrated within an Instrument Cluster Panel of the second vehicle 308), with the visible alert being associated with the predicted collision between the VRU 304 and the second vehicle 308. In another non-limiting example, the vehicle notification device can include a speaker 324 (e.g., a horn) emitting an audible alert associated with the predicted collision between the VRU 304 and the second vehicle 308.

In still another non-limiting example, the vehicle notification device 364 may further include one or more light projectors 366 coupled to the processor 350, with the light projector 366 projecting a light in an outboard direction from the first vehicle 306 to alert the VRU 304 and/or the occupant of the second vehicle 308 of the predicted collision between the VRU 304 and the second vehicle 308 at the predicted collision site 320, in response to the light projector 366 receiving the actuation signal from the processor 350. The light projector 366 can be mounted to one or both driver-side and passenger-side sideview mirrors 368, 370, a rear view mirror assembly 372, the front end structure 374, the rear end structure 376, or other suitable portions of the first vehicle 306. In one non-limiting example, the light projector 366 is configured to project the light onto a portion of a roadway 312 that is positioned adjacent to the first vehicle 306 and within the line of sight of the VRU 304 and/or the second vehicle 308. The light projector 366 is configured to project the light in the form of at least one of a pattern, a symbol, and a word that notify the VRU 304 and/or the occupant of the second vehicle 308 of the predicted collision between the VRU 304 and the second vehicle 308. As but on example, two light projectors can be attached to an associated one of a driver-side sideview mirror assembly 368 and a passenger-side sideview mirror assembly 370 for illuminating, with or without a strobe effect, the term "Collision" on a portion of the roadway surface that is within the line of sight of the VRU 304 and/or the second vehicle 308. In other examples, the light projector can be configured to project the light onto a screen attached to a front windshield 378, a rear windshield 380, a driver side window 382, a passenger side window 384, an outboard facing surface of any body panel, or directly toward an occupant of the second vehicle 308. In still other non-limiting examples, the vehicle notification device can include one or more headlights, tail lights, brake lights, turning signals, and/or turning signals.

In general, the computing systems and/or devices described may employ any of a number of computer operating systems, including, but by no means limited to, versions and/or varieties of the ANDROID AUTOMOTIVE OS developed by GOOGLE INC., the MICROSOFT WINDOWS operating system, the UNIX operating system (e.g., the SOLARIS operating system distributed by ORACLE Corporation of Redwood Shores, California), the AIX UNIX operating system distributed by INTERNATIONAL BUSINESS MACHINES of Armonk, New York, the LINUX operating system, the MAC OSX and iOS operating systems distributed by APPLE INC. of Cupertino, California, the BLACKBERRY OS distributed by BLACKBERRY LTD. of Waterloo, Canada, and the OPEN HANDSET ALLIANCE, or the QNX CAR Platform for Infotainment offered by QNX Software Systems. Examples of computing devices include, without limitation, an on board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The CRM that participates in providing data (e.g., instructions) may be read by the computer (e.g., by a processor of a computer and may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A warning system for alerting a Vulnerable Road User (VRU) of a predicted collision, the warning system comprising:
    at least one input device for transmitting a first input signal associated with a first vehicle positioned in a first lane of a roadway, a second input signal associated with a second vehicle positioned in a second lane of the roadway adjacent to the first lane, and a third input signal associated with the VRU located on a crosswalk that extends across the first and second lanes; and
    a computer mounted to a roadside sensor unit, the computer comprising:
        at least one processor electrically connected to the at least one input device and receiving the first, second, and third input signals from the at least one input device; and
        a non-transitory computer readable storage medium (CRM) for storing instructions, such that the at least one processor is programmed to:
            determine the predicted collision between the second vehicle and the VRU at a predicted collision site within a predicted time to collision based on the second and third input signals;

generate an actuation signal in response to the at least one processor determining the predicted collision;

wherein at least one roadway notification device is coupled to the roadway for notifying the VRU that the second vehicle is positioned in the second lane and headed toward the predicted collision site in the crosswalk in response to the at least one roadway notification device receiving the actuation signal from the at least one processor.

2. The warning system of claim 1 wherein the at least one processor is further programmed to:

determine that the first vehicle has a heading toward the VRU and the first vehicle is waiting for the VRU to travel across the crosswalk in response to the at least one processor receiving the first and third input signals from the at least one input device; and generate the actuation signal in further response to the at least one processor determining that the first vehicle has a heading toward the VRU and the first vehicle is waiting for the VRU to travel across the crosswalk.

3. The warning system of claim 2 wherein the at least one processor is further programmed to:

determine that the second vehicle is travelling toward the predicted collision site in the crosswalk in response to the at least one processor receiving the second and third input signals from the at least one input device; and generate the actuation signal in further response to the at least one processor determining that the second vehicle is travelling toward the predicted collision site in the crosswalk.

4. The warning system of claim 3 wherein the at least one processor is further programmed to:

determine that the VRU is travelling toward the predicted collision site in the crosswalk in response to the at least one processor receiving the second and third input signals from the at least one input device; and generate the actuation signal in further response to the at least one processor determining that the VRU is travelling toward the predicted collision site in the crosswalk.

5. The warning system of claim 4 wherein the at least one processor is further programmed to:

determine a predicted time-to-collision (predicted TTC) in response to the at least one processor receiving the first and third input signals from the at least one input device;

compare the predicted TTC to a predetermined time threshold; and generate the actuation signal in further response to the at least one processor determining that the predicted TTC is less than the predetermined time threshold.

6. The warning system of claim 4 wherein the at least one processor is further programmed to:

determine that the second vehicle is located at a closing distance from the predicted collision site in response to the at least one processor receiving the second and third input signals from the at least one input device;

compare the closing distance to a predetermined distance threshold; and generate the actuation signal in further response to the at least one processor determining that the closing distance is less than the predetermined distance threshold.

7. The warning system of claim 4 wherein the at least one roadway notification device comprises at least one of a display device for displaying a visible alert related to the VRU, a speaker for emitting an audible alert related to the VRU, and a haptic device.

8. The warning system of claim 7 wherein the at least one roadway notification device further comprises at least one of:

a traffic light signal facing the second vehicle, with the traffic light signal emitting a red light in response to the traffic light signal receiving the actuation signal from the at least one processor; and a plurality of indicator lights attached to the roadway and positioned about the crosswalk, with the indicator lights emitting a light in response to the indicator lights receiving the actuation signal from the at least one processor.

9. A warning system for alerting a Vulnerable Road User (VRU) of a predicted collision, the warning system comprising:

at least one input device for transmitting a first input signal associated with a first vehicle positioned in a first lane of a roadway, a second input signal associated with a second vehicle positioned in a second lane of the roadway adjacent to the first lane, and a third input signal associated with the VRU located on a crosswalk that extends across the first and second lanes;

at least one roadway notification device coupled to at least one of the roadway and the first vehicle, with at least one roadway notification device positioned within a line of sight of the VRU and notifying the VRU that the second vehicle is positioned in the second lane and headed toward the crosswalk; and a computer mounted to each of the first vehicle and a roadside sensor unit, the computer comprising:

at least one processor electrically connected to the at least one input device and receiving the first, second, and third input signals from the at least one input device; and a non-transitory computer readable storage medium (CRM) for storing instructions, such that the at least one processor is programmed to:

determine the predicted collision between the second vehicle and the VRU at a predicted collision site within a predicted time to collision based on the second and third input signals;

generate an actuation signal in response to the at least one processor determining the predicted collision;

wherein the at least one roadway notification device notifies the VRU that the second vehicle is positioned in the second lane and headed toward predicted collision site in the crosswalk in response to the at least one roadway notification device receiving the actuation signal from the at least one processor.

10. The warning system of claim 9 wherein the at least one input device comprises at least one of a RADAR device, and a V2X input device.

11. The warning system of claim 10 wherein the at least one input device further comprises a forward collision module integrated within at least one of the first vehicle and a roadside sensor unit, the forward collision module being configured to generate the first input signal associated with the VRU being positioned in a first path of the first vehicle and having a heading toward the predicted collision site within a second path of the second vehicle.

12. The warning system of claim 9 further comprising at least one vehicle notification device mounted to the first vehicle, with the at least one vehicle notification device configured to notify the VRU that the second vehicle is positioned in the second lane and headed toward the predicted collision site in the crosswalk in response to the at least one vehicle notification device receiving the actuation signal from the at least one processor.

13. The warning system of claim 9 wherein the at least one processor is further programmed to:
    determine that the first vehicle has a heading toward the VRU and the first vehicle is waiting for the VRU to travel across the crosswalk in response to the at least one processor receiving the first and third input signals from the at least one input device; and
    generate the actuation signal in further response to the at least one processor determining that the first vehicle has a heading toward the VRU and the first vehicle is waiting for the VRU to travel across the crosswalk.

14. The warning system of claim 13 wherein the at least one processor is further programmed to:
    determine that the second vehicle is travelling toward the predicted collision site in the crosswalk in response to the at least one processor receiving the second and third input signals from the at least one input device; and
    generate the actuation signal in further response to the at least one processor determining that the second vehicle is travelling toward the predicted collision site in the crosswalk.

15. The warning system of claim 14 wherein the at least one processor is further programmed to:
    determine that the VRU is travelling toward the predicted collision site in the crosswalk in response to the at least one processor receiving the second and third input signals from the at least one input device; and
    generate the actuation signal in further response to the at least one processor determining that the VRU is travelling toward the predicted collision site in the crosswalk.

16. The warning system of claim 15 wherein the at least one processor is further programmed to:
    determine a predicted time-to-collision (predicted TTC) in response to the at least one processor receiving the first and third input signals from the at least one input device;
    compare the predicted TTC to a predetermined time threshold; and
    generate the actuation signal in further response to the at least one processor determining that the predicted TTC is less than the predetermined time threshold.

17. The warning system of claim 16 wherein the at least one processor is further programmed to:
    determine that the second vehicle is located at a closing distance from the predicted collision site in response to the at least one processor receiving the second input signal from the at least one input device;
    compare the closing distance to a predetermined distance threshold; and
    generate the actuation signal in further response to the at least one processor determining that the closing distance is less than the predetermined distance threshold.

18. A method of operating a warning system for alerting a Vulnerable Road User (VRU) of a predicted collision, the method comprising:
    transmitting, using at least one input device, a first input signal associated with a first vehicle positioned in a first lane of a roadway;
    transmitting, using the at least one input device, a second input signal associated with a second vehicle positioned in a second lane of the roadway adjacent to the first lane;
    transmitting, using the at least one input device, a third input signal associated with the VRU located on a crosswalk that extends across the first and second lanes;
    determining, using at least one processor of a computer that has a non-transitory computer readable storage medium (CRM) for storing instructions, the predicted collision between the second vehicle and the VRU at a predicted collision site within a predicted time to collision based on the second and third input signals;
    generating, using the at least one processor, an actuation signal in response to the at least one processor determining the predicted collision; and
    notifying, using at least one roadway notification device, the VRU that the second vehicle is positioned in the second lane and headed toward the predicted collision site in the crosswalk in response to the at least one roadway notification device receiving the actuation signal from the at least one processor.

19. The method of claim 18 further comprising:
    determining, using the at least one processor, that the first vehicle has a heading toward the VRU and the first vehicle is waiting for the VRU to travel across the crosswalk in response to the at least one processor receiving the first and third input signals from the at least one input device;
    determining, using the at least one processor, that the second vehicle is travelling toward the predicted collision site in the crosswalk in response to the at least one processor receiving the second and third input signals from the at least one input device;
    determining, using the at least one processor, that the VRU is travelling toward the predicted collision site in the crosswalk in response to the at least one processor receiving the first and third input signals from the at least one input device; and
    generating the actuation signal in further response to the at least one processor:
        determining that the first vehicle has a heading toward the VRU and the first vehicle is waiting for the VRU to travel across the crosswalk; and
        determining that the second vehicle and the VRU are travelling toward the predicted collision site in the crosswalk.

20. The method of claim 19 further comprising:
    determining, using the at least one processor, that the second vehicle is located at a closing distance from the predicted collision site in response to the at least one processor receiving the second and third input signals from the at least one input device;
    comparing, using the at least one processor, the closing distance to a predetermined distance threshold;
    determining, using the at least one processor, a predicted time-to-collision (predicted TTC) in response to the at least one processor receiving the second and third input signals from the at least one input device;
    comparing, using the at least one processor, the predicted TTC to a predetermined time threshold; and
    generating, using the at least one processor, the actuation signal in further response to the at least one processor determining that the closing distance is less than the predetermined distance threshold and further determining that the predicted TTC is less than the predetermined time threshold.

* * * * *